United States Patent [19]
Hayashi et al.

[11] Patent Number: 4,594,409
[45] Date of Patent: * Jun. 10, 1986

[54] PRODUCING SEQUENTIAL POLYAMINO ACID RESIN

[75] Inventors: Ikuo Hayashi, Koriyama; Tadao Itikawa, Fukushima; Kiyoshi Shimizu, Koriyama, all of Japan

[73] Assignee: Nitto Boseki Co., Ltd., Fukushima, Japan

[*] Notice: The portion of the term of this patent subsequent to Jun. 25, 2002 has been disclaimed.

[21] Appl. No.: 646,317

[22] Filed: Aug. 30, 1984

[30] Foreign Application Priority Data

Sep. 2, 1983 [JP] Japan ................... 58-161650

[51] Int. Cl.$^4$ .............................. C08G 69/10
[52] U.S. Cl. ..................... 528/328; 528/313; 528/315; 528/321; 528/322
[58] Field of Search ............. 528/328, 313, 315, 321, 528/322

[56] References Cited

U.S. PATENT DOCUMENTS 4,132,746  1/1979  Urry et al. ................. 528/328
4,525,576  6/1985  Hayashi et al. ............ 528/328

FOREIGN PATENT DOCUMENTS 137495  4/1977  Japan.

OTHER PUBLICATIONS

Bull. Chem. Soc. Japan 31 (7), 802–807: Kitaoka et al., "Synthesis of Poly-(L-Prolyl-L-Leucyl-Glycyl ... " (Oct. 1958).
J. Pharm. Sci. 63, 313–327: Johnson, "Synthesis, Structure, and Biological Properties of Sequential Polypeptides" (Mar. 1974).
Chemistry and Biochemistry of Amino Acids, Peptides, and Proteins, vol. 4, pp. 29–63: Jones, "Sequential Polypeptide Synthesis".

Primary Examiner—Harold D. Anderson
Attorney, Agent, or Firm—Bert J. Lewen; Henry Sternberg

[57] ABSTRACT

A sequential polyamino acid resin having a remarkably high molecular weight and special amino acid sequence as repeating unit in the resin can be produced by conducting polycondensation of a peptide active ester acid salt in an aprotic polar solvent in the presence of a tertiary amine and phosphorus pentoxide.

8 Claims, 1 Drawing Figure

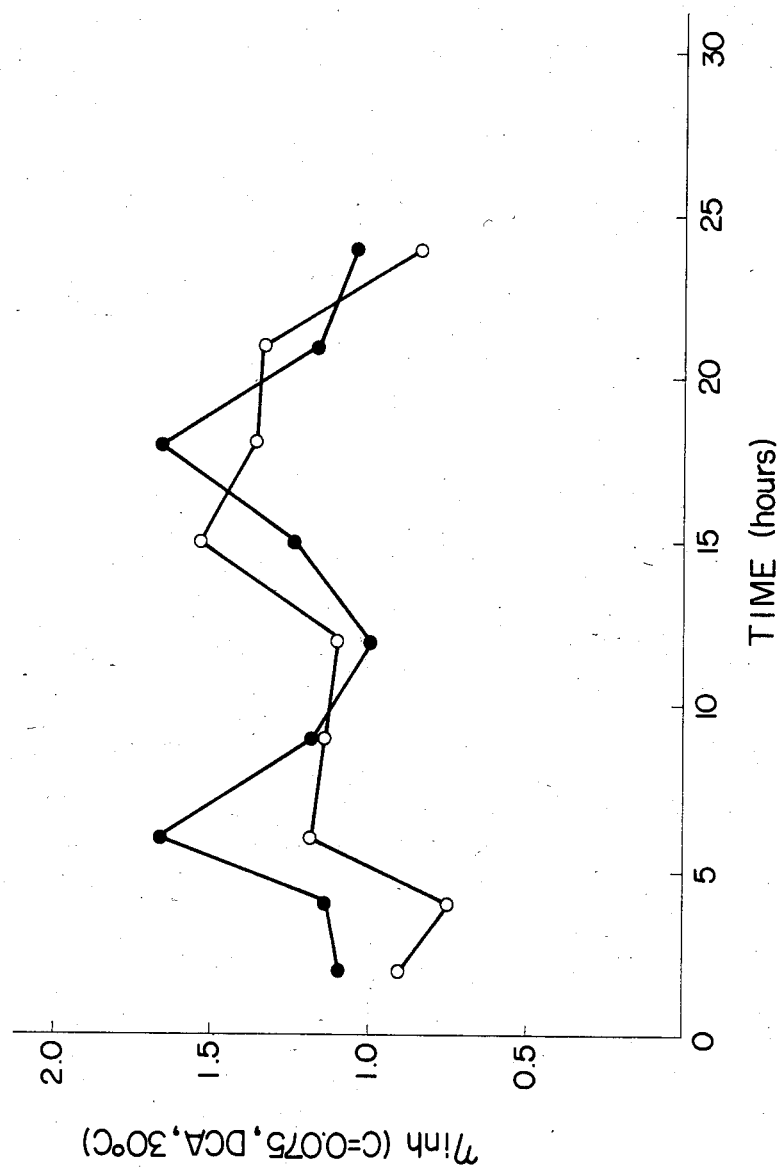

PRODUCING SEQUENTIAL POLYAMINO ACID RESIN

BACKGROUND OF THE INVENTION

This invention relates to a process for producing a sequential polyamino acid resin having a high degree of polymerization and a constant amino acid sequence as separating unit in the resin.

Proteins for constituting living bodies and peptide hormones have sequences of various kinds of amino acids with a constant order and molecular weights of from several thousands to several hundred thousands. But detailed studies on the structure of these proteins and peptide hormones revealed that special sequential order of two to four kinds of amino acids forms repeating units in most cases. Further, in the case of peptide hormones having physiological activity, the sequence of all the amino acids is not necessary but the sequence of special several kinds of amino acids controls the physiological activity in many cases. For example, it is well known that collagen which is a kind of protein for constituting a living body has sequential polyamino acid moieties in large amounts containing the sequence of residues of 3 kinds of amino acids, i.e., X-prolyl-glycyl- (wherein X is a residue of amino acid such as proline, hydroxyproline, etc.), and muscle protein myosin has leucyl-glycyl moieties in large amounts. In peptide hormones, gastrin, for example, is a hormone having the sequence of 17 amino acids but only 4 special amino acids sequence is sufficient for exhibiting the action of hormone.

Therefore, if high molecular weight polyamino acids having these special amino acid sequences as repeating units can be produced, they can be used for medical treatments in the form of fibers or film as materials having excellent suitability for living bodies when they are synthetic polyamino acid resins having functions and structures similar to the objected proteins, or can be used as medicines having prolonged and effective pharmacological efficiency by gradually decomposing at special portions on the affected parts when they are high molecular weight polyamino acid resins having peptides with physiological activity as repeating units due to their stability.

Polyamino acids can be synthesized by polymerization of an amino acid-N-carboxy anhydride (NCA). According to this NCA method, the composition of the produced polyamino acid is determined unitarily by reactivities of individual amino acid-NCAs and proportions of charged amino acid-NCAs. But the composition ratio of individual amino acids in the polymer is only determined and this does not mean that a sequential polyamino acid constructing from a required amino acid sequence can be obtained.

In order to overcome such a disadvantage, there have been proposed various polymerization methods by using as monomer activated peptides having the desired amino acid sequences. For example, there are proposed a method for polymerizing L-prolyl-L-leucyl-glycine.-hydrochloride in the presence of dicyclohexylcarbodiimide and an alkali (hereinafter referred to as "DCC method"), a method for polymerizing a chlorinated phenyl ester of L-prolyl-L-leucyl-glycine.trifluoroacetate in the presence of an organic amine (hereinafter referred to as "active ester method") [H. Kitaoka, S. Sakakibara, H. Tani: Bull, Chem. Soc. Japan, 31(7), 802–807 (1958); Japanese Patent Appln Kokai (Laid-Open) No. 137495/77]. There is also proposed a method wherein a peptide active ester is used as monomer in a coupling method of amino acid [B. J. Johnson: J. Pharm. Sci. 63(3), 313–327 (1974); "Chemistry and Biochemistry of Amino Acids, Peptides and Proteins" edited by B. Weinstein, vol. 4, pp 29–63, Marcel Dekker Inc., N.Y., 1977].

But the molecular weights of the resulting polymers obtained by the above-mentioned methods are several thousands or less in average molecular weight with an inherent viscosity ($\eta$inh) (C=0.5) of 0.1 to 0.2 at most. Such molecular weights are so low that these polymers cannot be used as synthetic protein. Therefore, it has generally been admitted that a polyamino acid having a very high molecular weight cannot be produced.

SUMMARY OF THE INVENTION

It is an object of this invention to provide a process for producing a sequencial polyamino acid resin having a very high molecular weight.

This invention provides a process for producing a sequential polyamino acid resin having a high molecular weight and special amino acid sequence as repeating unit in the resin, which comprises conducting a polycondensation reaction of a peptide active ester acid salt represented by the formula:

$$H—X_1—X_2—X_3— \cdots —X_nY.Z \qquad (I)$$

wherein $X_1$ through $X_n$ are independently L-, D- or DL-$\alpha$-amino acid residues protected or non-protected at a side chain in the formula: H—$X_{\bar{n}}$——OH (in which $\bar{n}$ is a number of 1 through n; H is a hydrogen atom in an amino group and may be replaced by a protective group for an amino acid; and OH is the hydroxyl moiety in a carboxyl group); H is a hydrogen atom in an amino group; Y is a functional group represented by the formula:

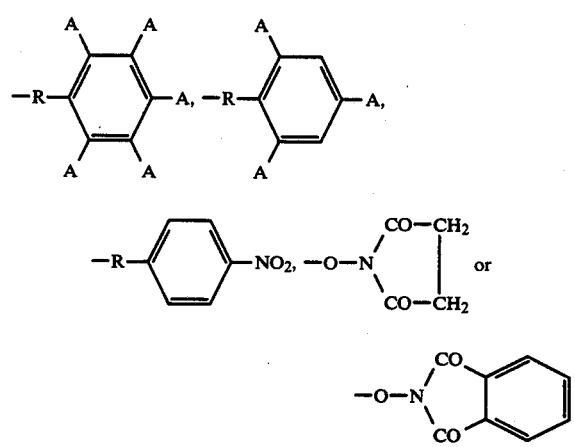

(in which A is a chlorine or bromine atom; and R is a sulfur or oxygen atom); Z is HBr, HCl, HF, CF$_3$COOH or p-toluenesulfonic acid; and n is an integer of 3 to 10, in an aprotic polar solvent in the presence of a tertiary amine and phosphorus pentoxide

BRIEF DESCRIPTION OF THE DRAWING

The attached drawing is a graph showing a relationship between an inherent viscosity and an addition time of phosphorus pentoxide.

DESCRIPTION OF THE PREFERRED EMBODIMENTS

In this invention, the peptide active ester acid salt of the formula (I) is used as a monomer. Examples of α-amino acids of the formula: $H-X_n-OH$ ($n=1$ through n) are alanine (Ala), glycine (Gly), serine (Ser), valine Val), threonine (Thr), cysteine (CySH), leucine (Leu), isoleucine (Ileu), methionine (Met), phenylalanine (Phe), tyrosine (Tyr), aspartic acid (Asp), glutamic acid (Glu), asparagine ($AspNH_2$), glutamine ($GluNH_2$), lysine (Lys), arginine (Arg), cystine (CyS), proline (Pro), hydroxyproline (Hyp), histidine (His), etc.

Examples of combinations of these α-amino acids are as follows:
Pro-Leu-Gly
Ala-Gly-Gly
Ser-Gly-Gly
Pro-Phe-Gly
Pro-Lys-Gly
Lys-Gly-Gly
Pro-Gly-Gly
Pro-Pro-Gly
Lys-Glu-Gly
Pro-Hyp-Gly
Ala-Phe-Gly
Ala-Leu-Gly
Ala-Gly-Gly-Gly
Pro-Leu-Gly-Gly
Pro-Gly-Pro-Gly
Lys-Glu-Lys-Glu
Asp-Lys-Pro-Leu-Gly α-Amino acids ore than 5 amino acid residual units can be obtained by a conventional peptide synthesis (condensation reaction) using the tripeptides and the like mentioned above.

Preferable examples of the combinations of α-amino acids are Pro-Leu-Gly, Ala-Gly-Gly, Pro-Phe-Gly, Ala-Phe-Gly, Pro-Lys-Gly, Pro-Gly-Gly, Pro-Pro-Gly, etc.

Preferable examples of the peptide active ester acid salts of the formula (I) are as follows:
prolyl-leucyl-glycine pentachlorophenyl ester. hydrochloride,
prolyl-leucyl-glycine p-nitrophenyl ester.hydrochloride,
prolyl-leucyl-glycine succinimide ester.hydrochloride,
prolyl-N-ε-benzyloxycarbonyl-lysyl-glycine pentachlorophenyl ester.hydrochloride,
prolyl-phenylalanyl-glycine pentachlorophenyl ester.hydrochloride, and
alanyl-phenylalanyl-glycine pentachlorophenyl ester.hydrobromide.

The peptide active ester acid salts of the formula (I) used as a monomer in this invention preferably have a high purity. They can be prepared by a conventional peptide synthesis method. For example, a methyl or ethyl ester of an amino acid is coupled with an amino group-protected amino acid, the protective group for amino group is selectively removed, followed by coupling with an amino group-protected amino acid. Repeating these procedures, there can be obtained an amino group-protected peptide ester having an amino acid skelton necessary for the monomer. Subsequently, the alkyl ester moiety of the resulting product is selectively cut, followed by coupling with an active alcohol such as a chlorinated phenol to produce an amino group-protected peptide active ester. After removing the protective group for amino group, there is obtained the peptide active ester acid salt of the formula (I) used as the monomer.

As the protective group for amino acid, there can be used conventional ones such as a benzyloxycarbonyl group, a p-methoxybenzyloxycarbonyl group, a t-butyloxycarbonyl group, a t-amyloxycarbonyl group, an o-nitrophenylsulfenyl group, a t-butoxycarbonyl-N-ε-benzyloxycarbonyl group, etc.

As the active alcohol, there can be used chlorinated phenols such as pentachlorophenol, 2,4,6-or 2,4,5-trichlorophenol, p-chlorophenol, etc., nitrophenols such as p-nitrophenol, o-nitrophenol, etc., N-hydroxyimides such as N-hydroxysuccinimide, etc.

For preparing the peptide active ester acid salts of the formula (I), the above-mentioned conventional DCC method, active ester method, and NCA method can be used alone or in combination. But since the yield and purity of the product in the peptide synthesis are remarkably influenced by the order of combination and reagents used, and the polymerization reaction is also influenced, much care is necessary for employing these methods.

In order to prevent the racemization during the polymerization (peptide synthesis), it is preferable to use an amino acid having no optically active carbon in theory as carboxyl terminal, for example, glycine. Further, in this invention, there can be used peptites having 3 to 10 amino acid residues, but from the economical point of view, the use of peptides having 3 to 5, more specifically 3 or 4 amino acid residues as the monomer is preferable.

The peptide active ester acid salt of the formula (I) is dissolved in an aprotic polar solvent.

As the aprotic polar solvent, there can be used dimethylformamide (DMF), diethylformamide, dimethylacetamide, dimethyl sulfoxide (DMSO), tetramethylurea, hexamethylphosphoramide, N-methyl-2-pyrrolidone, diethyl phosphite, etc. These solvents can be used alone or as a mixture thereof.

The polycondensation of the peptide active ester acid salt of the formula (I) dissolved in the aprotic polar solvent is carried out in the presence of a tertiary amine.

As the tertiary amine, there can be used triethylamine, triethanolamine, trimethylamine, N-methyl morpholine, N,N'-dimethyl piperadine, etc. Among them, triethylamine and N-methyl morpholine are preferable.

The tertiary amine is used preferably in an amount of 1 to 5 equivalent weight per equivalent weight of the monomer of the formula (I). If the amount is too small, the catalytic effect is insufficient, while if the amount is too large, racemization takes place due to the presence of free base.

Phosphorus pentoxide is added to the reaction mixture preferably after 10 minutes to 48 hours from the beginning of the polymerization (polycondensation) (that is, the addition of a tertiary amine to the aprotic polar solvent dissolving the monomer of the formula (I)) in an amount of preferably 0.01 to 10 equivalent weight per equivalent weight of the monomer of the formula (I). If the amount is too small, the effect for increasing the degree of polymerization is insufficient, while if the amount is too large, the whole polymerization system solidifies and loses practical value. More preferable amount of phosphorus pentoxide is 1 to 3 equivalent weight per equivalent weight of the monomer of the formula (I).

Phosphorus pentoxide can be added to the reaction mixture at one time or at several times without influencing the degree of polymerization or without lowering optical purity of the polyamino acid.

The polycondensation is preferably carried out at room temperature (20° C.) to 100° C. for several hours to about 2 weeks, more preferably 3 to 10 days. The reaction is mainly carried out in the gel state.

After the reaction, the resulting sequential polyamino acid resin can be recovered by a conventional method. For example, chloroform is added to the reaction solution and the polyamino acid resin is deposited by adding ethyl ether thereto. After washing with water and then acetone or methanol, the polyamino acid resin is dissolved in dichloroacetic acid, hexafluoroisopropanol, dimethylformamide, or trifluoroethanol, reprecipitated with ethyl ether, washed with water and then acetone or methanol and dried to give purified polyamino acid resin. In the case of a water-soluble polymer such as (Pro-Pro-Gly)$_n$, it can be purified by dialysis using cellophane film.

The resulting polyamino acid resin usually has a remarkably high molecular weight [an inherent viscosity ($\eta$inh) of 0.7 to 3 dl/g (measured in DCA (dichloroacetic acid) at a concentration (C) of 0.075 g/dl at 30° C.)]and can be dissolved in dichloroacetic acid, 1,1,1,3,3,3- hexafluoro-2-propanol, 1,1,1-trifluoroethanol, etc. Amino acid analytical values of acid hydrolysis product of the resulting polyamino acid resin well agree to the composition of amino acids used as monomer and the elementary analysis values are also in good agreement with the theoretical values. Further, infrared spectra of the polyamino acid resin show characteristic absorptions of polypeptide.

The thus produced polyamino acid resin can be used as high polymers for medical use, artificial skin, various medicines having gradual and prolonged pharmacological efficiency, a coating material for burn and a base for mecidines and cosmetics. More in detail, according to this invention, since a peptide having a special combination of minimum units necessary for physiological activity or structure similar to a living body can be polymerized as it is until a very high molecular weight is obtained in contrast to conventional methods wherein random copolymers are obtained, the resulting sequential polyamino acid resin can be used as protein models in diverse areas. Further, even if a sequential polyamino acid can be obtained by a known method, the molecular weight of the resulting polyamino acid is considerably low compared with that obtained according to this invention. In addition, since a high molecular weight sequential polyamino acid resin is produced according to this invention, excellent film-forming properties for artificial skin and higher mechanical strength compared with conventional low molecular weight polyamino acid can be obtained by properly selecting the combination of unit amino acids.

This invention is illustrated by way of the following Examples.

EXAMPLE 1

[Production of N-t-butoxycarbonyl-prolyl-leucyl-glycine]

In 800 ml of methylene chloride, 145.8 g of glycine methyl ester.hydrochloride was suspended. To this suspension, 178 ml of triethylamine was added dropwise with ice cooling. To the resulting mixture, a solution obtained by dissolving 268.6 g of N-t-butoxycarbonyl-leucine (L-form: all the amino acids used except for glycine were of L-form hereinafter) in 600 ml of methylene chloride was added, followed by dropwise addition of a solution obtained by dissolving 240.0 g of dicyclohexylcarbodiimide (DCC) in 600 ml of methylene chloride with ice cooling to carry out the reaction at 0° C. or lower with stirring overnight. The deposited dicyclohexylurea (DCU) was filtered and the solvent in the filtrate was removed by distillation. After extracting the residue with 3 l of ethyl acetate, the extract was washed with 5% citric acid aqueous solution, saturated sodium chloride aqueous solution, 1N sodium bicarbonate aqueous solution and saturated sodium chloride aqueous solution in this order and dried over magnesium sulfate. Then, the solvent was removed by distillation to give white crystals having a melting point of 129°-130° C. in yield of 256.7 g (73.4%). The Rf value in thin layer chromatography (TLC) using silica gel and ethyl acetate as developer was 0.91, when ninhydrin in acetone solution was used as color producing reagent (the same color producing reagent was used in the following Examples).

The resulting dipeptide ester in an amount of 301.4 g was dissolved in 3.5 l of ethyl acetate and hydrogen chloride gas was thrown into the solution with cooling. After about 1 hour, the solution became clear. The introduction of hydrogen chloride gas was continued for additional about 3 hours, followed by condensation. As a result, leucyl-glycine methyl ester hydrochloride was obtained quantitatively in yield of 250.6 g.

Then, 250.6 g of the resulting leucyl-glycine methyl ester.hydrochloride was dissolved in 1 l of methylene chloride, cooled with ice, neutralized with dropwise addition of triethylamine, followed by addition of 215.3 g of N-t-butoxycarbonyl-proline. To the mixture, a solution obtained by dissolving 227.0 g of DCC in 900 ml of methylene chloride was added with cooling and the reaction was carried out at 0° C. overnight with stirring. After the reaction, the deposited DCU was filtered and the filtrate was washed and the solvent was removed by distillation. The residue was dissolved in 7 l of ethyl acetate, washed by a conventional method, and dried to give crystals in yield of 341.1 g (85.4%) after removing the ethyl acetate by distillation. The crystals of N-t-butoxycarbonyl-prolyl-leucyl-glycine methyl ester had a melting point of 110°-111° C., Rf of 0.76 (in TLC using chloroform:methanol: acetic acid =95:5:3 by volume) and $[\alpha]_D^{24} = -75.2°$ (C=1, ethanol).

The thus obtained N-t-butoxycarbonyl-prolylleucyl-glycine methyl ester in an amount of 294.6 g was dissolved in 1.6 l of methanol. To this, 1.6 l of 1N-NaOH was added dropwise with ice cooling and the reaction was carried out at room temperature for 2 hours. Subsequently, 20% citric acid was added dropwise to the reaction mixture to make the pH 3 to 4. Then, the whole reaction mixture was extracted with 5 l of ethyl acetate, and the extract was washed well with 5% citric acid solution and saturated sodium chloride aqueous solution, and dried. After removing the solvent by distillation, a white solid was obtained. The resulting solid of N-t-butoxycarbonyl-prolyl-leucyl-glycine was purified by washing with petroleum ether. Yield: 269.3 g (94.7%). Melting point 87°-90° C. $[\alpha]_D^{20} = -80.5°$ (C=1, ethanol). Rf =0.46 (TLC, chloroform: methanol: acetic acid =95:5:3 by volume).

EXAMPLE 2

[Production of N-t-butoxycarbonyl-propyl-leucyl-glycine pentachlorophenyl ester]

N-t-Butoxycarbonyl-prolyl-leucyl-glycine in an amount of 115.6 g and 83.9 g of pentachlorophenol were dissolved in 2 l of methylen chloride. To this, a solution obtained by dissolving 65.0 g of DCC in 1 l of methylene chloride was added dropwise with ice cooling (0 – –15° C.) and the reaction was carried out overnight. After the reaction, the deposited DCU was filtered and methylene chloride was removed by distillation from the filtrate. Then, the residue was dissolved in 6.5 l of ethyl acetate, washed with 5% citric acid solution, saturated sodium chloride aqueous solution, and saturated sodium bicarbonate solution and dried. After removing the solvent by distillation, there was obtained a solid. After washing with petroleum ether twice, 157.7 g of crude crystals were obtained in yield of 83.0%. The crude crystals were purified by recrystallization from ethyl acetate-etherpetroleum ether, filtration and washing with ether to give purified crystals of N-t-butoxycarbonyl-prolyl-leucyl-glicine pentachlorophenyl ester in 142.6 g (75.0%) having a melting point of 151°–153° C. and $[\alpha]_D^{25} = -59.7°$ (C=1, ethanol).

EXAMPLE 3

[Production of prolyl-leucyl-glycine pentachlorophenyl ester.hydrochloride]

The ester obtained in Example 2 in an amount of [1.5 g was dissolved in 1.5 l of ethyl acetate and into this, hydrogen chloride gas was thrown with cooling at 0° C. After standing at room temperature for 3 hours, the precipitate was filtered and washed with ethyl acetate and ether repeatingly to give a solid in yield of 72.3 g (98%).

Recrystallization from ethanol and ether gave crystals of prolyl-leucyl-glycine pentachlorophenyl ester.hydrochloride in yield of 61.5 g (83.8%) having a melting point of 169°–171° C. and $[\alpha]_D^{25} = -59.5°$ (C=1, ethanol).

EXAMPLE 4

[Production of prolyl-leucyl-glycine p-nitrophenyl ester.hydrochloride]

Prolyl-leucyl-glycine p-nitrophenyl ester obtained from N-t-butoxycarbonyl-prolyl-leucyl-glicine, p-nitrophenol and DCC by condensation in amount of 5.06 g was treated with 66 ml of 3.3 N HCl-ethyl acetate for 1.5 hours. Then, 200 ml of ether was added to the reaction solution, which was then filtered, washed with ether and recrystallized from methanol and ether to give crystals of prolyl-leucyl-glycine p-nitrophenyl ester.hydrochloride in yield of 3.92 g (88.6%) having a sintered point of 148°–152° C. and a melting point of 173° C. and $[\alpha]_D^{24} = -73.0°$ (C=1, ethanol).

| Elementary analysis (as $C_{19}H_{27}N_4O_6Cl$) | | | |
|---|---|---|---|
| | C (%) | H (%) | N (%) |
| Calculated | 51.53 | 6.14 | 12.65 |
| Found | 51.56 | 6.42 | 12.54 |

EXAMPLE 5

[Production of prolyl-leucyl-glycine succinimide ester.hydrochloride]

In 50 ml of tetrahydrofuran, 3.85 g of N-t-butoxycarbonyl-prolyl-leucyl-glycine and 1.15 g of N-hydroxysuccinimide were dissolved, and 2.06 g of DCC was added thereto with ice cooling to carry out the reaction at 0° C. for 24 hours. After the reaction, foaming solid was obtained quantitatively after conventional treatments. The resulting solid was treated with 3.3 N HCl-ethyl acetate for 1.5 hours to give a solid. The resulting solid was filtered, washed and recrystallized from methanol and ether to give crystals of prolyl-leucyl-glycine succinimide ester.hydrochloride in yield of 2.83 g (67.7%) having a decomposition point of 177°–180° C. and $[\alpha]_D^{24} = -63.7°$ (C=1, ethanol).

EXAMPLE 6

[Production of prolyl-N-ε-benzyloxycarbonyl-lysyl-glycine pentachlorophenyl ester.hydrochloride]

N-t-Butoxycarbonyl-prolyl-N-ε-benzyloxycarbonyllysyl-glycine ethyl ester was saponified in the same manner as described in Example 1 to give N-t-butoxycarbonylprolyl-N-ε-benzyloxycarbonyl-lysyl-glycine having a melting point of 70°–72° C. and Rf of 0.65 (TLC, chloroform: methanol: acetic acid =85:5:3 by volume).

| Elementary analysis (as $C_{26}H_{38}N_4O_8 = 534.615$) | | | |
|---|---|---|---|
| | C (%) | H (%) | N (%) |
| Calculated | 58.41 | 7.16 | 10.48 |
| Found | 58.14 | 7.43 | 10.56 |

Using the above-mentioned N-protected tripeptide, pentachlorophenol and DCC, the reaction was carried out in the same manner as described in Example 2, and there was obtained N-protected tripeptide pentachlorophenyl ester having a melting point of 153°–154° C. and $[\alpha]_D^{24} = -45.3°$ (C=1, ethanol).

The above-mentioned ester was treated and recrystallized in the same manner as described in Example 3 to give prolyl-N-ε-benzyloxycarbonyl-lysyl-glycine pentachlorophenyl ester.hydrochloride having a melting point of 159°–164° C., and $[\alpha]_D^{24} = -42.0°$ (C=1, ethanol).

| Elementary analysis (as $C_{27}H_{30}N_4O_6Cl_6 = 719.281$) | | | |
|---|---|---|---|
| | C (%) | H (%) | N (%) |
| Calculated | 45.09 | 4.20 | 7.79 |
| Found | 45.21 | 4.31 | 7.59 |

EXAMPLE 7

[Production of prolyl-phenylalanyl-glycine pentachlorophenyl ester.hydrochloride]

N-t-butoxycarbonyl-prolyl-phenylalanyl-glycine was synthesized from N-t-butoxycarbonyl-prolyl-phenylalanyl-glycine ethyl ester in the same manner as described in Example 1 in yield of 89.8%. Crystals obtained by recrystallization from ethyl acetate and petroleum ether had a melting point of 98°–100° C. and Rf=0.67 (TLC, chloroform: methanol: acetic acid=95:5:3 by volume).

| Elementary analysis (as $C_{21}H_{29}N_3O_6 = 419.481$) | | | |
|---|---|---|---|
| | C (%) | H (%) | N (%) |
| Calculated | 60.13 | 6.97 | 10.02 |
| Found | 59.96 | 7.23 | 9.69 |

Using the resulting N-t-butoxycarbonyl-prolyl-phenylalanyl-glycine, pentachlorophenol, and DCC, the reaction was carried out in the same manner as described in Example 2, and there was obtained pentachlorophenyl ester thereof having a melting point of 133°–135° C. and $[\alpha]_D^{27} = -47.4°$ (C=1.0, chloroform) after recrystallized from ethyl acetate and petroleum ether. Measured values in the elementary analysis were in good agreement with the calculated values.

N-t-Butoxycarbonyl-prolyl-phenylalanyl-glycine pentachlorophenyl ester in an amount of 36.4 g was dissolved in 410 ml of 2.2 N HCl-ethyl acetate. A precipitate was produced soon. After the reaction at room temperature for 1.5 hours, the precipitate was filtered, washed with ether and recrystallized from 1.2 l of methanol to give crystals of prolyl-phenylalanyl-glycine pentachlorophenyl ester.hydrochloride in yield of 21.5 g (65.2%) having a melting point of 182°–184° C. and Rf=0.78 (TLC, chloroform: methanol: acetic acid=85:5:3 by volume).

EXAMPLE 8

[Production of poly(prolyl-leucyl-glycine)]

Prolyl-leucyl-glycine pentachlorophenyl ester.hydrochloride obtained in Example 3 in an amount of 1.20 g was dissolved in 1.5 ml of dimethyl sulfoxide (DMSO) in a test tube. Then, 0.42 g of N-methyl morpholine (NMM) was added thereto. After three hours from the addition of NMM, 0.57 g of phosphorus pentoxide ($P_2O_5$) was added to the test tube. The reaction was continued at 40° C. for 6 days. The reaction mixture was a reddish brown gelatin-like solid. The reaction mixture solid was diluted with 15 ml of chloroform and then poured into 150 ml of ether to produce a solid. The solid was filtered, washed with acetone, water, acetone, and ether in this order, and dried in vacuum over $P_2O_5$. The product was yielded quantitatively.

Then, the product was dissolved in dichloroacetic acid (DCA), reprecipitated in ether, filtered and washed with acetone, water, acetone, and ether in this order for purification. After dried over $P_2O_5$, the obtain sequential poly(prolyl-leucyl-glycine) in yield of 0.41 g (72.8%) had an inherent viscosity, $\eta$inh=1.2 (C=0.075, using DCA measured at 30° C.), $[\alpha]_D^{25} = -178.8°$ (C=0.075, DCA), and a melting point of near 180° C. (decomposition). The poly(prolyl-leucyl-glycine) was not dissolved in solvents other than DCA, sulfuric acid, hexafluoroisopropanol and trifluoroethanol.

For comparison, when no $P_2O_5$ was added to the reaction solution, the resulting polyamino acid had $\eta$inh=0.18 (C=0.075, DCA, 30° C.), and $[\alpha]_D^{25} = -137.5°$ (C=0.075, DCA) in yield of 0.23 g (40.9%).

EXAMPLE 9

[Production of poly(prolyl-leucyl-glycine)]

In an Erlenmyer flask, 6.0 g of prolyl-leucyl-glycine pentachlorophenyl ester.hydrochloride obtained in Example 3 was dissolved in 7.5 ml of dimethyl sulfoxide and then 1.06 g of N-methyl morpholine (NMM) was added thereto. After 5 hours from the addition of NMM, 3.10 g of $P_2O_5$ was added into the flask and the reaction was continued at 40° C. for 6 days. After the reaction, the reaction mixture was treated and purified in the same manner as described in Example 8. Sequential poly(prolyl-leucyl-glycine) was obtained in yield of 1.74 g (61.9%), and had $\eta$inh=3.2 (C=0.075, DCA, 30° C.), $[\alpha]_D^{27} = -200.5°$ (C=0.075, DCA) and a melting point of near 180° C. (decomposition).

IR (Kbr method: $\nu_{max}$(cm$^{-1}$), 3400, 1650, 1545, 1450, 1330, 1250

EXAMPLE 10

[Production of poly(prolyl-leucyl-glycine)]

In a flask, 1.20 g of prolyl-leucyl-glycine pentachlorophenyl ester.hydrochloride obtained in Example 3 was dissolved in 1.5 ml or 2.0 ml of dimethyl sulfoxide and then 0.21 g of N-methyl morpholine was added thereto to start the reaction at 40° C. Then, 0.30 g of $P_2O_5$ was added to the reaction mixture at a time as plotted in the attached drawing. In the drawing, the line —o— means that 1.5 ml of dimethyl sulfoxide was used, while the line —•— means that 2.0 ml of dimethyl sulfoxide was used. The reaction was carried out at 40° C. for 6 days.

As shown in the drawing, $\eta$inh is above about 0.7 irrespective of the time at which $P_2O_5$ was added (in one time).

For comparison, when no $P_2O_5$ was added to the reaction solution, the resulting polyamino acid had $\eta$inh=0.25 (C=0.075, DCA, 30° C.) in the case of using 1.5 ml of dimethyl sulfoxide, and $\eta$inh=0.22 (C=0.075, DCA, 30° C.) in the case of using 2.0 ml of dimethyl sulfoxide.

EXAMPLE 11

[Production of poly(prolyl-N-ε-benzyloxycarbonyl-lysyl-glycine)]

In a flask, 1.44 g of prolyl-N-ε-benzyloxycarbonyl-lysyl-glycine pentachlorophenyl ester.hydrochloride obtained in Example 6 was dissolved in 2 ml of dimethyl sulfoxide and 0.405 g of N-methyl morpholine was added thereto to start the reaction at 40° C. After 3 hours from the addition of N-methyl morpholine, 0.57 g of $P_2O_5$ was added to the reaction mixture and the reaction was continued at 40° C. for 6 days. After the reaction, the reaction mixture was mixed with chloroform and poured in ether to precipitate the desired product. The precipitate was filtered, washed with 50% acetone aqueous solution, water, 50% acetone aqueous solution and ether in this order, dissolved in DCA, reprecipitated from ether, washed in the same manner as mentioned above and dried. Then, sequential poly(prolyl-N-ε-benzyloxycarbonyl-lysyl-glycine) was obtained in yield of 0.54 g (64.7%), and had $\eta$inh=0.65 (C=0.075, DCA, 30° C.) and $[\alpha]_D^{27} = -173.3°$ (C=0.075, DCA).

For comparison, when no $P_2O_5$ was added to the reaction solution, the resulting polyamino acid was in yield of 0.21 g (25.2%) and had $\eta$inh=0.21 (C=0.075, DCA, 30° C.) and $[\alpha]_D^{27} = -116.0°$ (C=0.075, DCA).

COMPARATIVE EXAMPLE 1

In a flask, 1.5 g of prolyl-N-ε-benzyloxycarbonyl-lysyl-glycine pentachlorophenyl ester.hydrochloride was dissolved in 4 ml of dimethyl formamide and 1.65 ml of triethylamine was added thereto. The reaction was carried out at 40° C. for 3 days. The resulting polymer was treated and purified in the same manner as described in Example 11. The resulting polymer had $\eta_{inh}=0.08$ (C=0.5, DCA, 30° C.) and a melting point of 116° C.

EXAMPLE 12

[Production of poly(prolyl-phenylalanyl-glycine)]

In a flask, 1.21 g of prolyl-phenylalanyl-glycine pentachlorophenyl ester.hydrochloride obtained in Example 7 was dissolved in 2 ml of dimethyl sulfoxide and 0.4 ml of N-methyl morpholine was added thereto to start the reaction at 40° C. The reaction was continued at 40° C. for 6 days without addition of $P_2O_5$ or with addition of 0.28 g or 0.57 g of $P_2O_5$ at a time as listed in Table 1. After the reaction, the resulting polymer (poly(prolyl-phenylalanyl-glycine was treated and purified in the same manner as described in Example 11. The results were as shown in Table 1.

TABLE 1

| Run No. | Monomer (g) | $P_2O_5$ Amount (g) | $P_2O_5$ Adding time (hr) | Yield (%) | $\eta_{inh}$ (30° C.) (C = 0.075, DCA) | $[\alpha]_D^{27}$ (C = 0.075, DCA) |
|---|---|---|---|---|---|---|
| 1 | 1.21 | 0 | — | 72.8 | 0.21 | −66.7° |
| 2 | " | 0.57 | 2 | 61.3 | 0.51 | −68.0° |
| 3 | " | 0.28 | 5 | 59.8 | 0.62 | −70.7° |
| 4 | " | 0.28 | 8 | 73.6 | 0.67 | −74.7° |

EXAMPLE 13

[Production of poly(prolyl-leucyl-glycine)]

In a flask, 1.0 g of prolyl-lucyl-glycine succinimide ester.hydrochloride obtained in Example 5 was dissolved in 2 ml of dimethyl sulfoxide and 0.483 g of N-methyl morpholine was added thereto to start the reaction at 40° C. After 5 hours from the addition of N-methyl morpholine, 0.34 g of $P_2O_5$ was added to the reaction mixture. The reaction was carried out at 40° C. for 6 days as a total. After the reaction, the reaction mixture was diluted with 20 ml of chloroform, followed by pouring into ether to produce a precipitate. The precipitate was filtered, and treated and purified in the same manner as described in Example 11. The sequential poly(prolyl-leucyl-glycine) was obtained in yield of 0.44 g (69.0%) and had $\eta_{inh}=0.82$ (C=0.075, DCA, 30° C.) and $[\alpha]_D^{27}=-184.0°$ (C=0.075, DCA).

EXAMPLE 14

[Production of poly(prolyl-leucyl-glycine)]

In a flask, 0.92 g of prolyl-leucyl-glycine p-nitrophenyl ester.hydrochloride obtained in Example 4 was dissolved in 1.5 ml of dimethyl sulfoxide and 0.426 g of N-methyl morpholine was added thereto to start the reaction at 40° C. After 8 hours from the addition of N-methyl morpholine, 0.62 g of $P_2O_5$ was added to the reaction mixture. The reaction was carried out at 40° C. for 6 days as a total. The reaction product was treated and purified in the same manner as described in Example 11 to give sequential poly(prolyl-leucyl-glycine) in yield of 0.37 g (65.7%) having $\eta_{inh}=0.60$ (C=0.075, DCA, 30° C.) and $[\alpha]_D^{27}=-156.0°$ (C=0.075, DCA).

For comparison, when no $P_2O_5$ was added to the reaction solution, the resulting polyamino acid was in yield of 0.36 g (63.9%) and had $\eta_{inh}=0.25$ (C=0.075, DCA, 30° C.) and $[\alpha]_D^{27}=-192.0°$ (C=0.075, DCA).

EXAMPLE 15

[Production of poly(alanyl-phenylalanyl-glycine)]

Glycine ethyl ester.hydrochloride in an amount of 20.6 g was dissolved in 500 ml of chloroform and 20 ml of triethylamine was added thereto. Then, 57.2 g of carbobenzoxyphenylalanine p-nitorphenyl ester was added to the resulting mixture and the reaction was carried out overnight at room temperaure. The resulting mixture was washed with IN-NaHCO$_3$, water, IN-HCl and water in this order and the chloroform layer was dried over magnesium sulfate MgSO$_4$). After removing the solvent by distillation, the residue was recrystallized from ethyl acetate and petroleum ether to give carbobenzoxy-phenylalanyl-glycine ethyl ester having a melting point of 110°-112° C. in yield of 40.5 g (81%).

To 200 ml of 25% hydrogen bromide/acetic acid (HBr/AcOH) solution, 38.4 g the above-obtained carbobenzoxyphenylalanyl-glycine ethyl ester was added and the reaction for removing the protective group was carried out at room temperature for 2 hours. After removing almost all the acetic acid by distillation, ether was added to the residue to wash well. The solid was filtered, washed with ether and recrystallized from ethanol and ether to give phenyl-alanyl-glycine ethyl ester.hydrobromide in yield of 30.5 g (92.1%).

The thus obtained hydrobromide in an amount of 30.0 g was added to 450 ml of pyridine. To the reaction product obtained by adding 12.7 ml of triethylamine, 32.7 g of carbobenzoxyalanine p-nitrophenyl ester was added and the reaction was carried out overnight at room temperature. After removing pyridine by distillation, the residue was extracted with chloroform. The chloroform layer was washed with a 5% Na$_2$CO$_3$ solution, water, 1N-HCl and water in this order and dried over MgSO$_4$. After removing the solvent by distillation, the residue was solidified by adding petroleum ether to give carbobenzoxy-analyl- phenylalanyl-glycine ethyl ester (Z-Ala-Phe-Gly-OEt) having a melting point of 182°-184° C. in yield of 38.7 g (94%).

To 350 ml of dioxane, 30 g of Z-Ala-Phe-Gly-OEt was added, followed by addition of 70 ml of 1N-NaOH. The reaction solution was dissolved at room temperature. After one hour's reaction, almost all the dioxane was removed by distillation, followed by neutralization with 70 ml of 1N-HCl. The resulting mixture was well extracted with ethyl acetate. The extract was dried over MgSO$_4$ and the solvent was removed by distillation to give carbobenzoxy-alanyl-phenylalanyl-glycine having a melting point of 168°-171° C. and $[\alpha]_D^{25}=-20.1°$ (C=1.0, DMF) in yield of 27.0 g (96%).

| Elementary analysis (as C$_{22}$H$_{25}$N$_3$O$_6$) | | | |
|---|---|---|---|
| | C (%) | H (%) | N (%) |
| Calculated | 61.82 | 5.90 | 9.83 |
| Found | 61.30 | 5.95 | 9.48 |

The thus obtained carbobenzoxy-alanyl-phenyl-alanyl-glycine in an amount of 10 g was dissolved in 50 ml of dimethylformamide (DMF) and 6.6 g of pentachlorophenol was added thereto. The solution was cooled to 0° C. and 5 g of dicyclohexyl urea (DCU) was added thereto with stirring. The reaction was carried out at 0° C. for 2 hours and at room temperature overnight. The DCU was filtered and almost all DMF was removed by distillation, followed by addition of ether to the residue to give a solid. The solid was dissolved in DMF and reprecipitated by ether to give 12.0 g (75.9%) of carbobenzoxy-alanyl-phenylalanyl-glycine pentachlorophenol ester having a melting point of 220°–225° C. and $[\alpha]_D^{25} = -10.0°$ (C=1, DMF).

| Elementary analysis (as $C_{28}H_{24}N_3O_6Cl_5$) | | | |
|---|---|---|---|
| | C (%) | H (%) | N (%) |
| Calculated | 49.77 | 3.58 | 6.22 |
| Found | 49.50 | 3.84 | 6.31 |

The thus obtained carbobenzoxy-alanyl-phenyl-alanyl-glycine pentachlorophenyl ester in an amount of 10.0 g was reacted with 50 ml of 25% hydrogen bromide/acetic acid at room temperature for 1.5 hours. After removing almost all the solvent by distillation, the redidue was well mixed with ether to give a solid. The solid was filtered and recrystallized from ethanol and ether to give alanyl-phenylalanyl-glycine pentachlorophenyl ester. hydrobromide having a melting point of 180°–183° C. and $[\alpha]_D^{25} = +8.7°$ (C=1.0, DMF) in yield of 5.05 g (54.8%).

| Elementary analysis (as $C_{20}H_{19}N_3O_5Cl_5Br$) | | | |
|---|---|---|---|
| | C (%) | H (%) | N (%) |
| Calculated | 38.59 | 3.08 | 6.75 |
| Found | 38.20 | 3.02 | 6.85 |

The above-mentioned monomer, i.e., alanyl-phenylalanyl-glycine pentachlorophenyl ester.hydrobromide in an amount of 1.00 g was mixed with 2 ml of dimethyl sulfoxide (DMSO) and 0.45 g (2 equivalent weight) of triethylamine was added thereto to conduct the polymerization at 40° C. for 5 hours. Then, 0.46 g of phosphorus pentoxide was added with agitation to the reaction mixture, which was allowed to stand at 40° C. for 7 days for carrying out the polymerization. Then, the reaction mixture was washed with ether, methanol, and water in this order repeatedly and filtered. The resulting solid was washed with methanol and ether, dried over $P_2O_5$ in vacuum to give sequential poly(alanyl-phenylalanyl-glycine) having an inherent viscosity, $\eta$inh=0.72 (C=0.075, DCA, at 30° C.) in yield of 0.38 g (86%).

When the polymerization was conducted in the same manner as mentioned above except for using N-methylpyrrolidone or dimethylformamide in place of DMSO, the resulting polyamino acid resins had an inherent viscosity of 0.55 and 0.50 (C=0.075, DCA, at 30° C.), respectively.

What is claimed is:

1. A process for producing a sequential polyamino acid resin having a high molecular weight and special amino acid sequence as repeating unit in the resin, which comprises
conducting a polycondensation reaction of a peptide active ester acid salt represented by the formula:

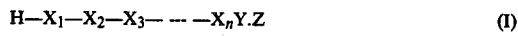

H—X$_1$—X$_2$—X$_3$— — —X$_n$Y.Z (I)

wherein X$_l$ through X$_n$ are independently L-, D- or DL-α-amino acid residues protected or non-protected at a side chain in the formula: H—X$_n$—OH, in which $\overline{n}$ is a number of 1 through n; H is a hydrogen atom in an amino group or a protective group for an amino acid; and OH is the OH moiety in a carboxyl group; Y is a functional group represented by the formula:

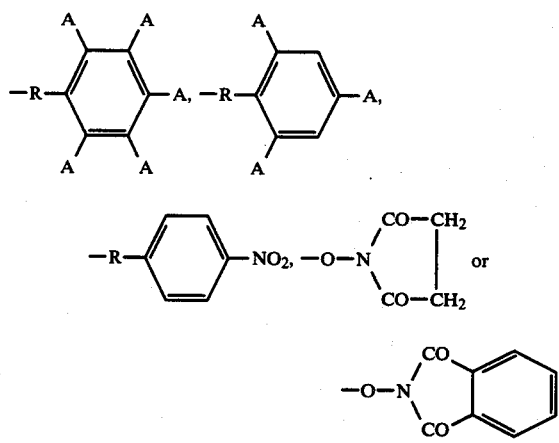

in which A is a chlorine or bromine atom; and R is a sulfur or oxygen atom; Z is HBr, HCl, HF, CF$_3$COOH or p-toluenesulfonic acid; and n is an integer of 3 to 10, in an aprotic polar solvent in the presence of a catalytic amount of a tertiary amine and sufficient phosphorus pentoxide to achieve the desired degree of polymerization.

2. A process according to claim 1, wherein the addition of phosphorus pentoxide to the reaction mixture is conducted after the addition of a tertiary amine to the reaction mixture.

3. A process according to claim 2, wherein the amount of tertiary amine to be added is 1 to 5 equivalent weight per equivalent weight of the peptide active ester acid salt of the formula (I).

4. A process according to claim 2, wherein the amount of phosphorus pentoxide to be added is 0.01 to 10 equivalent weight per equivalent weight of the peptide active ester acid salt of the formula (I).

5. A process according to claim 1, wherein the polycondensation reaction is carried out at 20°–100° C.

6. A process according to claim 2, wherein phosphorus pentoxide is added to the reaction mixture after 10 minutes to 48 hours from the beginning of the polycondensation.

7. A process according to claim 1, wherein the amino acid residues X$_1$ through X$_n$ in the formula (I) are a combination of
prolyl-leucyl-glycine,
alanyl-glycyl-glycine,
seryl-glycyl-glycine,
proplyl-phenylalanyl-glycine,
prolyl-lysyl-glycine,
prolyl-N-ε-benzyloxycarbonyl-lysyl-glycine,
lysyl-glycyl-glycine,
prolyl-glycyl-glycine,
prolyl-prolyl-glycine,
alanyl-phenylalanyl-glycine,
lysyl-glutanyl-glycine,
alanyl-glycyl-glycyl-glycine,
prolyl-leucyl-glycyl-glycine,
prolyl-glycyl-prolyl-glycine, or
lysyl-glutanyl-lysyl-glutamic acid.

8. A process according to claim 1, wherein the monomer of the formula (I) is
prolyl-leucyl-glycine pentachlorophenyl ester.hydrochloride, prolyl-leucyl-glycine p-nitrophenyl ester.hydrochloride, prolyl-leucyl-glycine succinimide ester.hydrochloride, prolyl-N-α-benzyloxycarbonyl-lysyl-glycine pentachlorophenyl ester.hydrochloride, prolyl-phenylalanyl-glycine pentachlorophenyl ester.hydrochloride, or alanyl-phenylalanyl-glycine pentachlorophenyl ester.hydrobromide.

* * * * *

UNITED STATES PATENT AND TRADEMARK OFFICE
CERTIFICATE OF CORRECTION

PATENT NO. : 4,594,409

DATED : June 10, 1986

INVENTOR(S) : Hayashi, Ikuo; Itikawa, Tadao & Shimizu, Kiyoshi

It is certified that error appears in the above-identified patent and that said Letters Patent is hereby corrected as shown below:

In claim 8, column 16, line 1, change "prolyl-N-$\alpha$-benzyloxycarbonyl-lysyl-glycine" to --prolyl-N-$\epsilon$-benzyloxycarbonyl-lysyl-glycine--.

Signed and Sealed this

Sixteenth Day of September 1986

[SEAL]

Attest:

DONALD J. QUIGG

Attesting Officer

Commissioner of Patents and Trademarks